Figure 1:
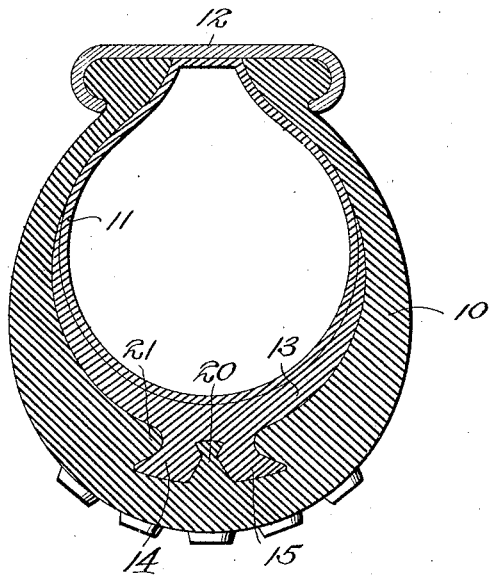

E. W. LEE.
PNEUMATIC TIRE.
APPLICATION FILED NOV. 30, 1920.

1,392,951.

Patented Oct. 11, 1921.

Inventor
Edward W. Lee,
by Henry T. Bright
Attorney

UNITED STATES PATENT OFFICE.

EDWARD W. LEE, OF LOS ANGELES, CALIFORNIA.

PNEUMATIC TIRE.

1,392,951.  Specification of Letters Patent.  Patented Oct. 11, 1921.

Application filed November 30, 1920. Serial No. 427,305.

*To all whom it may concern:*

Be it known that I, EDWARD W. LEE, a citizen of the United States, and resident of Los Angeles, in the county of Los Angeles and State of California, have invented certain new and useful Improvements in Pneumatic Tires, of which the following is a specification.

My invention relates to improvements in pneumatic tires and its purpose broadly is to provide a tire structure in which the liability of a puncture of the inner tube or a blow-out of the casing is reduced to a minimum.

More particularly it is a purpose of my invention to provide a novel construction of inner tube and casing whereby the inner tube is positively held in correct relation within the casing whether the tube is inflated or deflated, to thereby eliminate the possibility of pinching and puncture of the inner tube, which is a result, ordinarily, of the inner tube assuming an incorrect position within the casing when the tire is inflated.

Furthermore, it is a purpose of my invention to provide a tire in which the inner tube is held positively in a predetermined relation with the casing, and in which sharp or relatively sharp bends in the inner tube are eliminated, in order that pinching of the tube will not occur should the tire become partially deflated.

The essential features of my invention are illustrated in a preferred form in the accompanying drawings, but it is to be understood that the structure shown may be modified within the scope of my invention as defined in the appended claims.

In the drawing, wherein like characters of reference denote corresponding parts in the different views—

Figure 2:
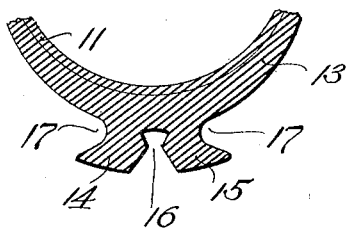
Figure 3:
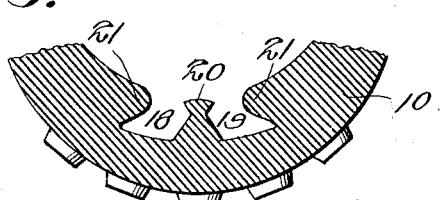

Figure 1 is a transverse section of a pneumatic tire embodying the novel and essential features of my invention;

Fig. 2, a fragmentary transverse section of the base portion of the inner tube; and Fig. 3, a fragmentary transverse section of the tread portion of the casing.

Referring to the drawings in detail, 10 designates the casing and 11 the inner tube of my improved tire, both of which are of the usual construction to the extent that the tube is housed by the casing and the latter mounted upon a rim 12 in a well known manner whereby the tire may be inflated and associated with a wheel for use.

The inner tube 11 is provided upon its outer periphery with a thickened portion or cushion 13 which is of substantially crescent shape in cross section and is preferably formed of rubber either as an integral part of or separate from the tube and suitably united therewith as may be desired, or as may be found to be a preferred construction in manufacture and use of the invention. This cushion 13 embraces what I will term the base or that portion of the inner tube remote from the rim 12 and as shown it merges into the sides of the tube smoothly and in unbroken curves. The interior of the casing 10 is shaped to snugly receive the inner tube when the latter is inflated so that, as will be observed particularly from Fig. 1 of the drawings, no sharp or relatively sharp bends exist in the tube to weaken the same or cause it to be pinched should the tire become partially deflated. Furthermore, it is apparent that by the provision of the crescent shaped cushion 13 the base of the inner tube is rendered considerably greater in thickness than the remaining portions thereof and obviously this cushion will eliminate to a considerable extent the liability of the tube being punctured, while in addition said cushion reinforces the tube and enables it to withstand the pressure of air therein whereby blow-outs due to a bruised or damaged tire are reduced to a minimum.

The outer periphery of the cushion 13, at the base thereof, is molded to form a pair of annular ribs 14 and 15, separated by an annular space or pocket 16. The walls of this pocket as viewed transversely are angularly disposed with respect to the axis of the tube and converge relatively inward throughout preferably a major portion of the depth of the ribs until a narrow neck is reached when they are diverged relatively and extend to the base of said pocket. The outer lateral portion of each rib is of substantially triangular shape and is undercut as at 17 in the direction of the base of said cushion 13.

In the inner periphery of the casing 10 is formed a pair of annular grooves or channels 18 and 19 separated by a tongue 20, and each rib is provided with an overhanging proturbance 21 to cause said channels to correspond in shape to the ribs aforementioned, and likewise the tongue 20 is shaped to correspond to the shape of the space or pocket 16, all as clearly illustrated in the drawings.

As shown in Fig. 1 the ribs 14 and 15 are adapted to be received by the channels 18 and 19, respectively, and the tongue 20 received by the pocket 16, whereby the tube and casing are positively held in a correct relative relation whether the tire is inflated or deflated, a locking action occurring between the ribs and grooves of the tube and casing, respectively, to retain the tube in place within the casing as is obvious, such locking action occurring as a result of forcing the triangular portion of the ribs 14 and 15 into the channels 18 and 19 respectively, and the tongue 20 into the pocket 16, until the expansive action of the rubber results in a snug interfit of said parts. It will be noted in this connection that the angular disposition of the walls of the pocket 16 and tongue 20 facilitate the operation of lockingly engaging the tube with the casing by producing a wedging action tending to force the ribs into the channels and the overhanging protuberances of the casing into the undercut portions of the tube.

Having thus described my invention, what I claim as new is:—

1. In a pneumatic tire, the combination with a casing provided in its inner periphery with a pair of annular channels and an annular tongue separating said channels, of an inner tube provided upon its outer periphery with a pair of annular ribs and an annular pocket separating said ribs, said ribs being adapted to be received by said channels and said tongue being adapted to be received by said pocket, whereby the casing and inner tube are locked together in predetermined relation.

2. In a pneumatic tire, the combination with a casing provided in its inner periphery with annular channels and an annular tongue, of an inner tube provided upon its outer periphery with annular ribs and an annular pocket, said ribs and said tongue being adapted to be received by said channels and said pocket, respectively, and the walls of said pocket and said tongue being relatively angularly disposed to facilitate engagement of said ribs with said channels.

3. In a pneumatic tire, the combination of a casing provided upon its inner periphery with an annular tongue, and an inner tube provided in the outer periphery with an annular channel adapted to receive said tongue, whereby the casing and tube may be locked together in predetermined relation.

4. In a pneumatic tire, an inner tube including a cushion carried by and embracing its base portion, said cushion being of substantially crescent shape in cross section and merging into the tube smoothly and in unbroken curves, a casing adapted to receive said tube, and means between said casing and tube including a tongue and recess adapted to relatively interlock to maintain the tube and casing in predetermined relative relation.

In testimony whereof I hereunto affix my signature.

EDWARD W. LEE.